(12) United States Patent
Serpeloni

(10) Patent No.: US 11,254,204 B2
(45) Date of Patent: Feb. 22, 2022

(54) LOCK OF A MOTOR VEHICLE LID WITH POSITION SENSOR

(71) Applicant: CEBI ITALY S.P.A., Dronero (IT)

(72) Inventor: Angelo Serpeloni, Ancona (IT)

( * ) Notice: Subject to any disclaimer, the term of this patent is extended or adjusted under 35 U.S.C. 154(b) by 0 days.

(21) Appl. No.: 16/973,293

(22) PCT Filed: Jun. 28, 2019

(86) PCT No.: PCT/EP2019/067374
§ 371 (c)(1),
(2) Date: Dec. 8, 2020

(87) PCT Pub. No.: WO2020/007737
PCT Pub. Date: Jan. 9, 2020

(65) Prior Publication Data
US 2021/0245598 A1    Aug. 12, 2021

(30) Foreign Application Priority Data
Jul. 3, 2018   (IT) ......................... 102018000006901

(51) Int. Cl.
*B60K 15/05*   (2006.01)
*B60K 15/04*   (2006.01)

(52) U.S. Cl.
CPC .......... *B60K 15/05* (2013.01); *B60K 15/0406* (2013.01); *B60K 2015/0546* (2013.01);
(Continued)

(58) Field of Classification Search
CPC ................ B60K 15/05; B60K 15/0406; B60K 2015/0546; B60K 2015/0576;
(Continued)

(56) References Cited

U.S. PATENT DOCUMENTS 8,585,119 B2 *  11/2013  Beck ...................... B60K 15/05
                                                           296/97.22
9,359,796 B2 *   6/2016  Betzen .................... E05B 83/34
                         (Continued)

FOREIGN PATENT DOCUMENTS

DE       102011116067 A1    1/2013
EP          1295748 B1      2/2007
                 (Continued)

OTHER PUBLICATIONS

International Search Report for corresponding PCT/EP2019/067374, dated Nov. 11, 2019.
(Continued)

*Primary Examiner* — Nicolas A Arnett
(74) *Attorney, Agent, or Firm* — Egbert, McDaniel & Swartz, PLLC

(57) ABSTRACT

A lock of a motor vehicle lid has a box and a cover, a locking pin provided with a head that protrudes from the cover to engage with a housing of a lid in order to close the lid. The locking pin is internally empty and has a through axial channel. A central pin is mounted with the possibility of sliding in an axial direction in the through axial channel of the locking pin. A spring is disposed between the box and the central pin to push the central pin and the locking pin to the extracted position. Detection is provided in the box to detect when the central pin is in retracted position or in extracted position.

10 Claims, 14 Drawing Sheets

(52) U.S. Cl.
CPC ................ *B60K 2015/0576* (2013.01); *B60K 2015/0584* (2013.01)

(58) Field of Classification Search
CPC ...... B60K 2015/0584; B60K 2015/053; B60K 2015/0561
See application file for complete search history.

(56) References Cited

U.S. PATENT DOCUMENTS

| | | | | |
|---|---|---|---|---|
| 9,493,967 | B2* | 11/2016 | Basavarajappa | E05B 83/34 |
| 9,670,701 | B2* | 6/2017 | Okawa | E05B 81/15 |
| 9,950,615 | B2* | 4/2018 | Horikawa | E05C 19/022 |
| 10,006,230 | B2* | 6/2018 | Nam | E05B 83/34 |
| 10,011,170 | B2* | 7/2018 | Horikawa | E05B 47/0012 |
| 10,155,441 | B2* | 12/2018 | Kim | E05F 15/60 |
| 10,196,840 | B2* | 2/2019 | Beck | E05B 81/66 |
| 10,443,277 | B2* | 10/2019 | Basavarajappa | E05B 83/34 |
| 10,730,386 | B2* | 8/2020 | Persiani | E05C 19/022 |
| 10,767,400 | B2* | 9/2020 | Sonobe | E05B 83/34 |
| 10,875,401 | B2* | 12/2020 | Zhao | B60K 15/05 |
| 10,919,381 | B2* | 2/2021 | Langkau | E05C 19/022 |
| 2010/0045049 | A1 | 2/2010 | Persiani et al. | |
| 2013/0154402 | A1* | 6/2013 | Basavarajappa | B60K 15/05 310/20 |
| 2018/0105036 | A1* | 4/2018 | Guardianelli | E05B 81/16 |
| 2019/0291571 | A1* | 9/2019 | Guo | E05B 83/34 |
| 2020/0384853 | A1* | 12/2020 | Mimura | B60R 25/24 |

FOREIGN PATENT DOCUMENTS

| | | |
|---|---|---|
| FR | 3001488 A1 | 8/2014 |
| WO | 2016098851 A1 | 6/2016 |

OTHER PUBLICATIONS

Written Opinion of the International Searching Authority for corresponding PCT/EP2019/067374, dated Nov. 11, 2019.

* cited by examiner

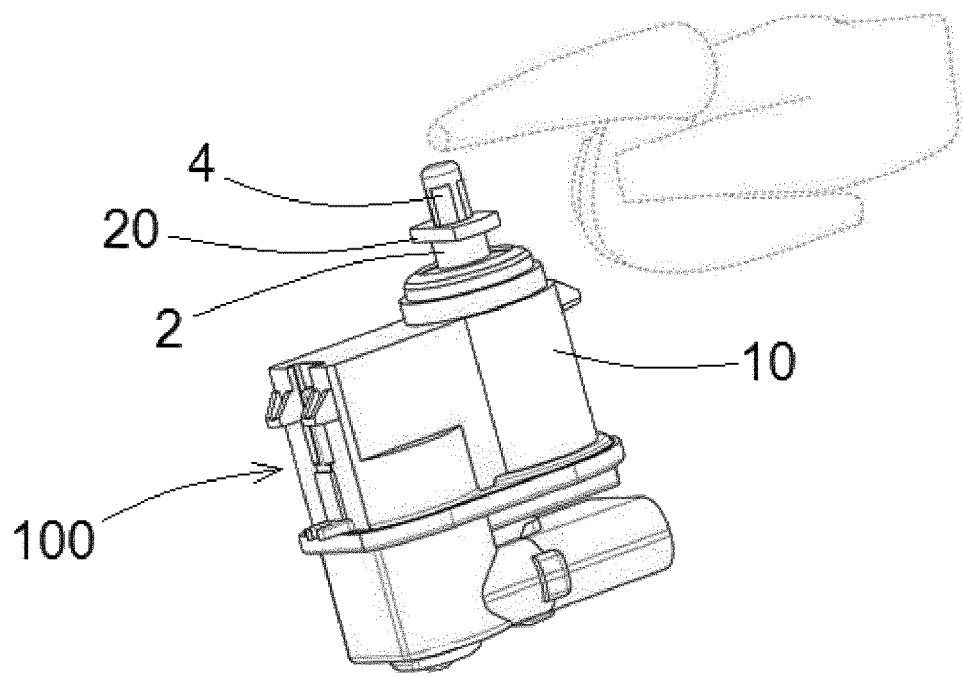
FIG. 7A
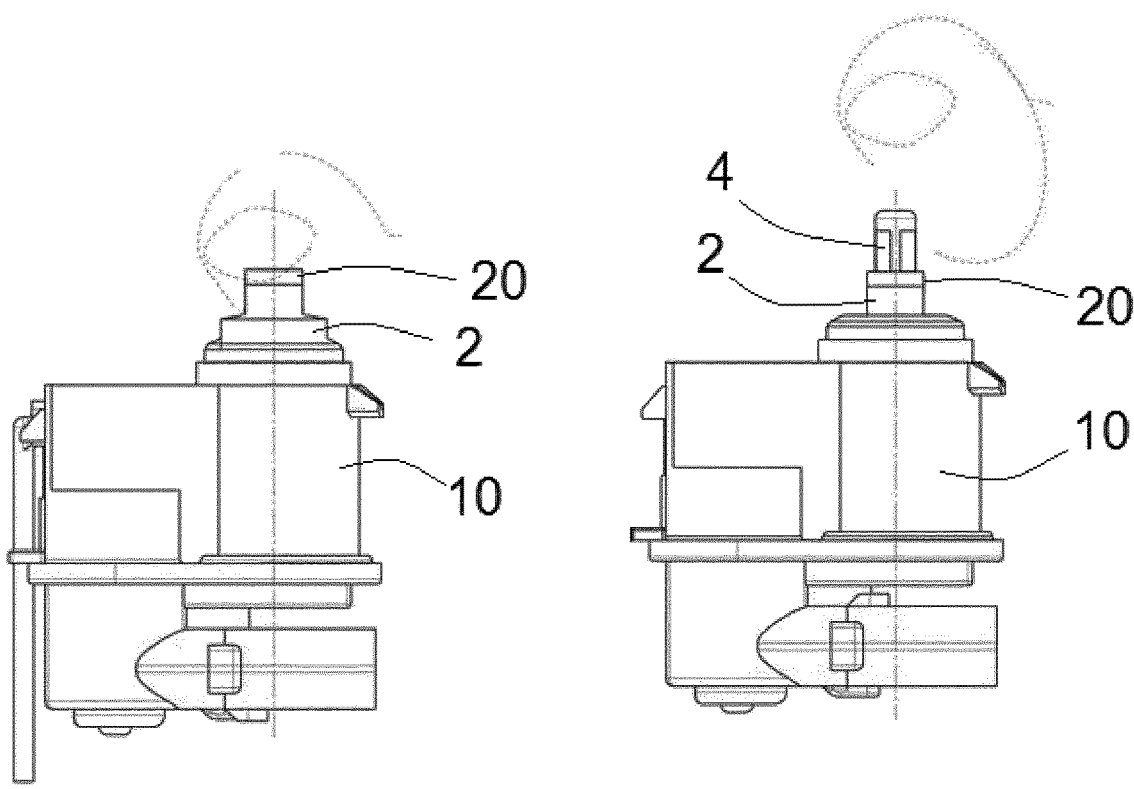
FIG. 7B
FIG. 7C

LOCK OF A MOTOR VEHICLE LID WITH POSITION SENSOR

The present patent application for industrial invention relates to a lock of a motor vehicle lid, and particularly to a lock of a fuel tank lid in vehicles with internal combustion engine or to a lock of a lid of an electric charging socket for vehicles with electric motor.

Although the following description will refer to a fuel tank lid, the invention is also extended to a lock of a lid of an electric charging socket.

Various types of locks of fuel tank lids are known on the market.

The EP1295748 patent application in the name of Volkswagen discloses a closure mechanism of the fuel tank lid comprising an actuator assembly that actuates a rototranslating pin with a "T-shaped" head in axial section, which is engaged in a slot or eyelet obtained in a seat of a fuel tank lid in such a way to close the fuel tank safely. However, EP1295748 does not disclose the use of sensors to detect the closure of the lid or of the rototranslating pin.

The use of sensors, which generally consist in micro-switches, is known to detect the closing of the locking pin of the lid lock. In fact, when the lid is closed manually, said lid pushes the locking pin, which reaches its end-of-travel position. A sensor detects such a closing position of the locking pin and sends a confirmation signal to an actuator that blocks the locking pin in locking position.

However, such a detection system is impaired by a severe drawback. In fact, if the user accidentally pushes the locking pin when the lid is open, said locking pin will reach the closing position. Therefore, the sensor will detect that the locking pin is in closing position and the actuator will lock the pin when the lid is open. It must be considered that such an involuntary actuation of the locking pin is quite common, considering for example the numerous situations in which the user introduces the fuel pump nozzle in the mouth of the fuel conduit that is close to the locking pin.

The purpose of the present invention is to eliminate the drawbacks of the prior art by providing a lock for a fuel tank lid of a motor vehicle that is reliable and suitable for avoiding the involuntary tampering of the locking pin of the lock.

Another purpose is to disclose such a lock that has a reduced volume, a limited number of parts, is inexpensive and easy to make and install.

These purposes are achieved according to the invention with the characteristics of the independent claim 1.

Advantageous embodiments of the invention appear from the dependent claims.

The lock of the invention is defined by claim 1.

Additional features of the invention will appear manifest from the following detailed description, which refers to a merely illustrative, not limiting embodiment illustrated in the attached figures, wherein.

Figure 8:
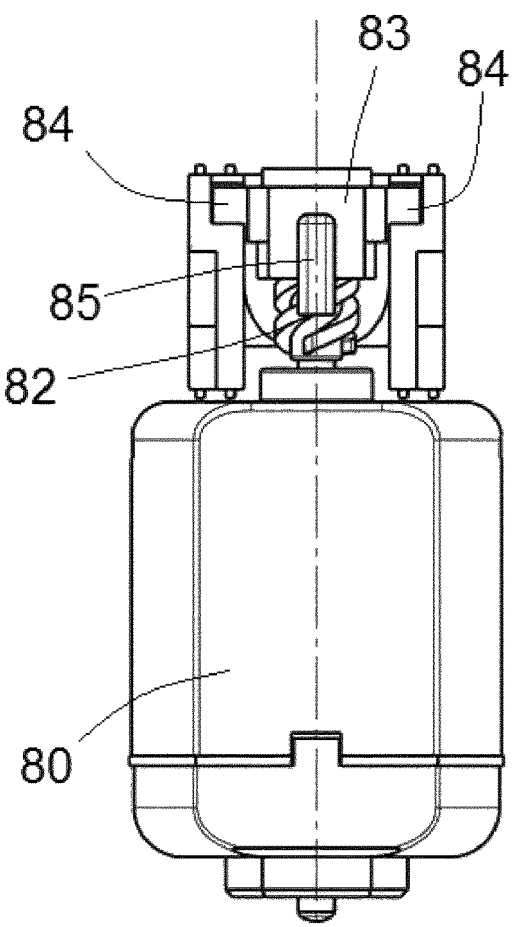
Figure 9:
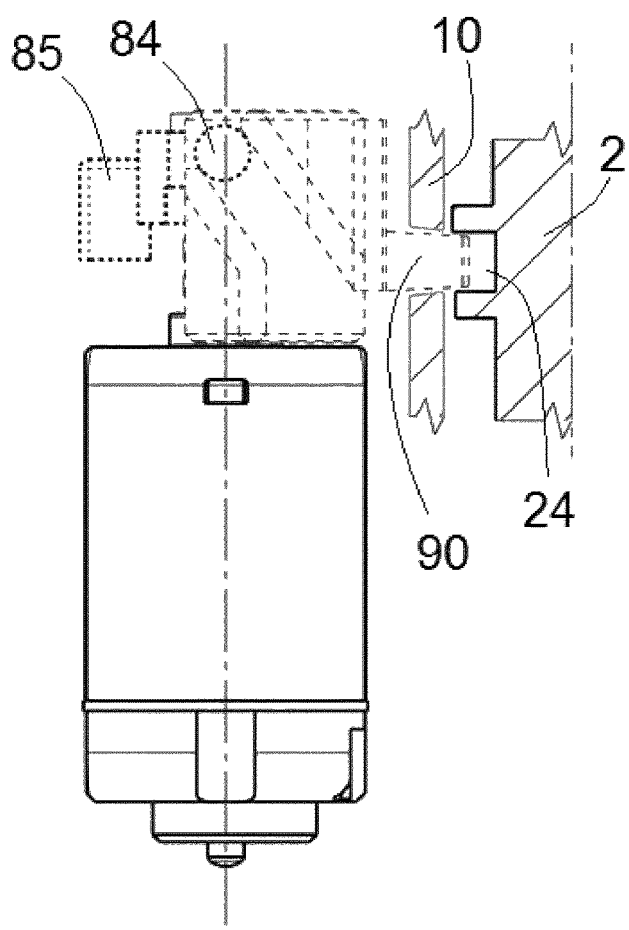
Figure 10:
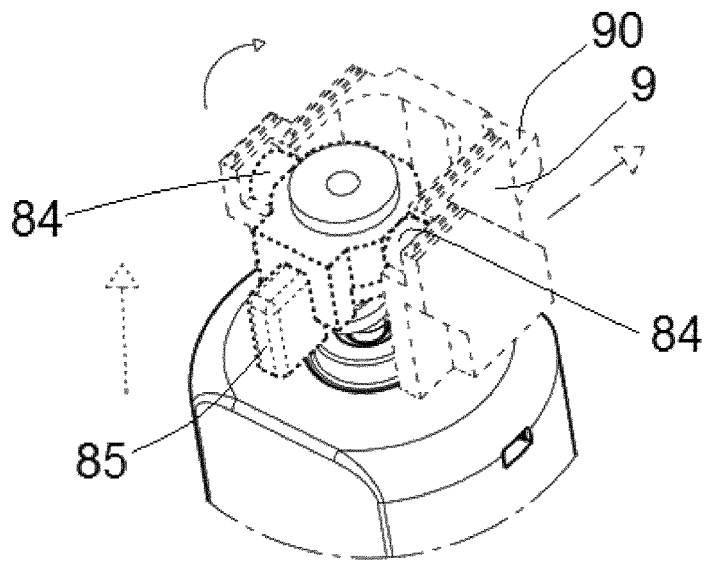
Figure 11:
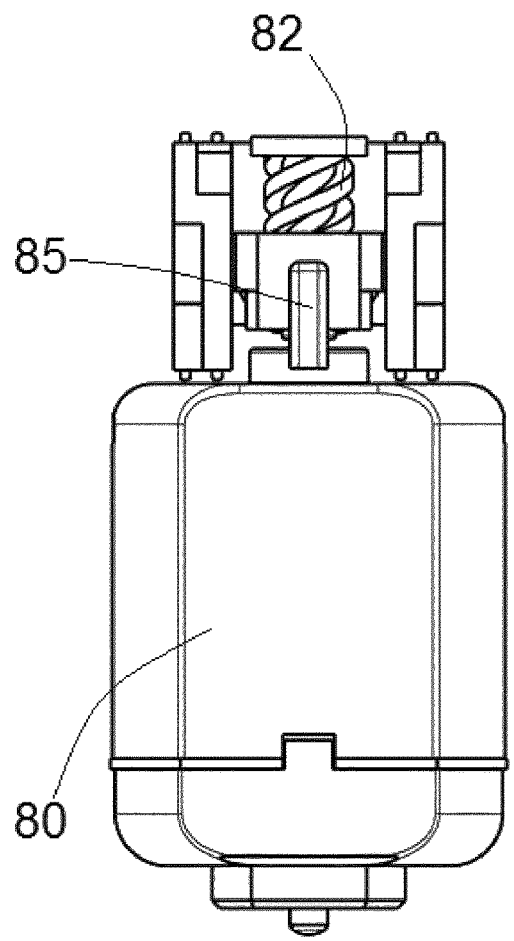
Figure 12:
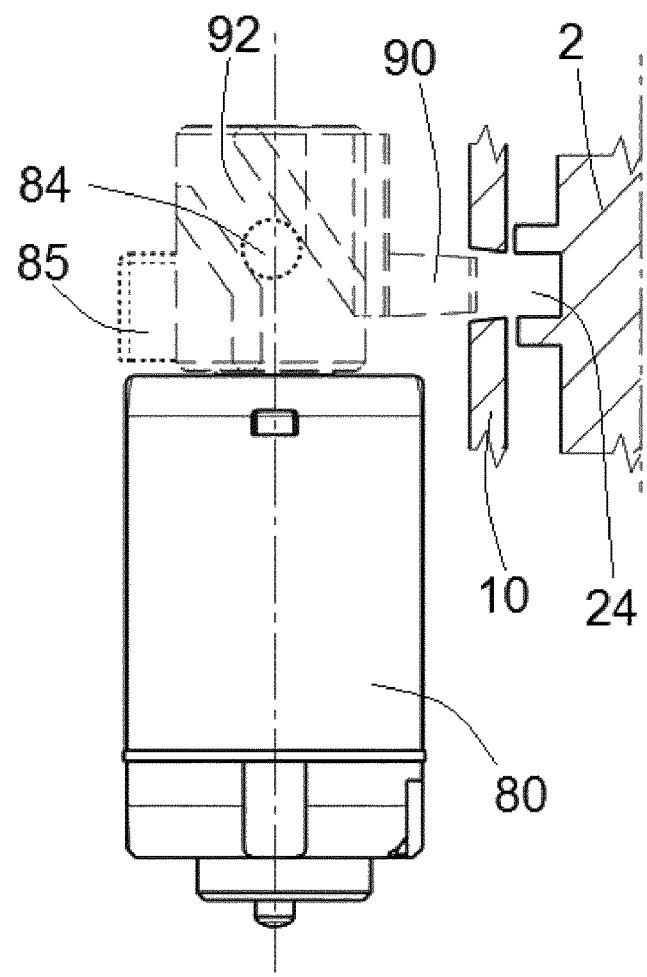
Figure 13:
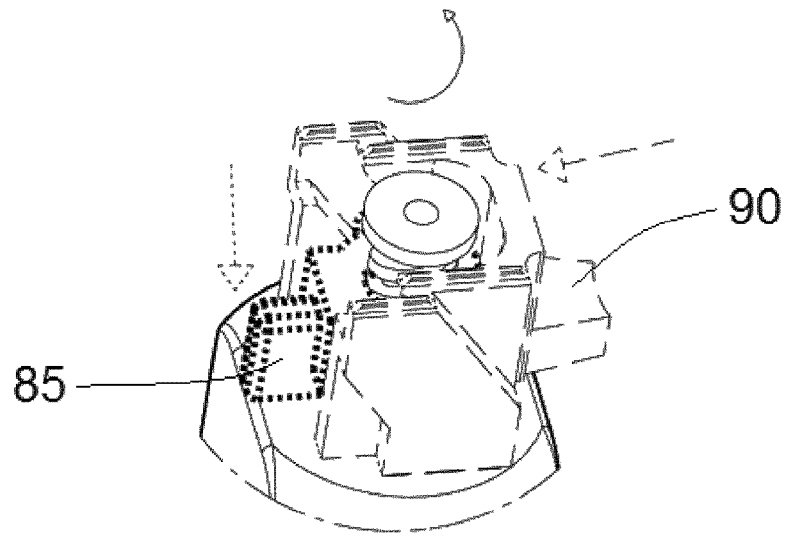

FIGS. 7A, 7B, and 7C are perspective side views that show an accidental actuation of the locking pin of the lock according to the invention;

FIG. 8 is a front view of the actuator of the lock according to the invention in locking position;

FIG. 9 is a side view of the actuator of FIG. 8;

FIG. 10 is a perspective view of a portion of the actuator of FIG. 8;

FIG. 11 is a front view of the actuator of the lock according to the invention in unlocking position;

FIG. 12 is a side view of the actuator of FIG. 11;

FIG. 13 is a perspective view of a portion of the actuator of FIG. 11;

FIGS. 14A, 14B, 14C, 14D and 14E are perspective side views that show five operating steps of the lock according to the invention.

With reference to the Figures, the lock of the invention is disclosed, which is generally indicated with reference numeral 100.

In the following description, the terms "upper" and "lower" will refer to the position of the lock in the figures, it being understood that the lock can be installed in the vehicle in any direction.

Figure 1:
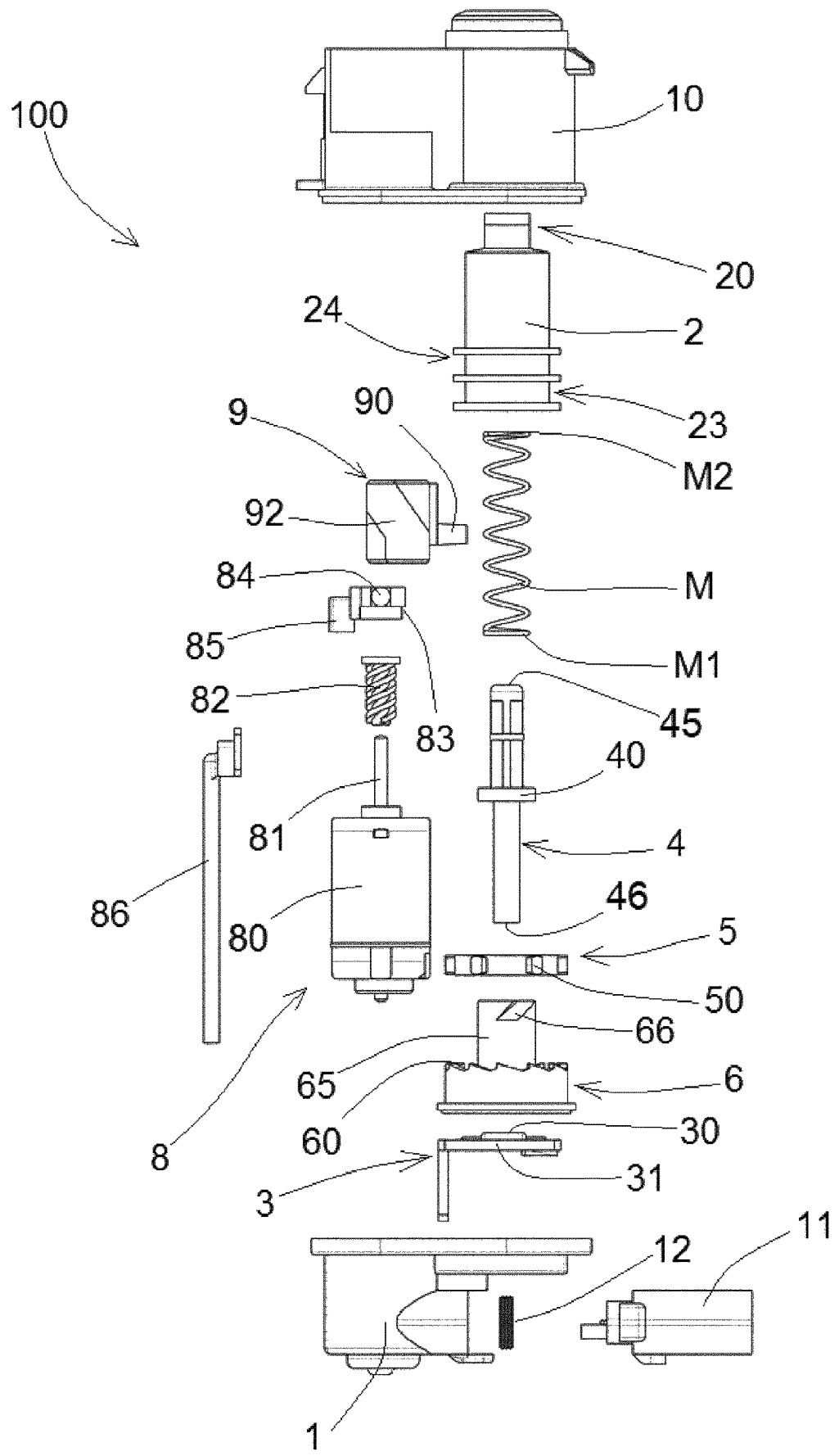
FIG. 1 is an exploded side view of the parts of the lock of the invention.
Figure 2:
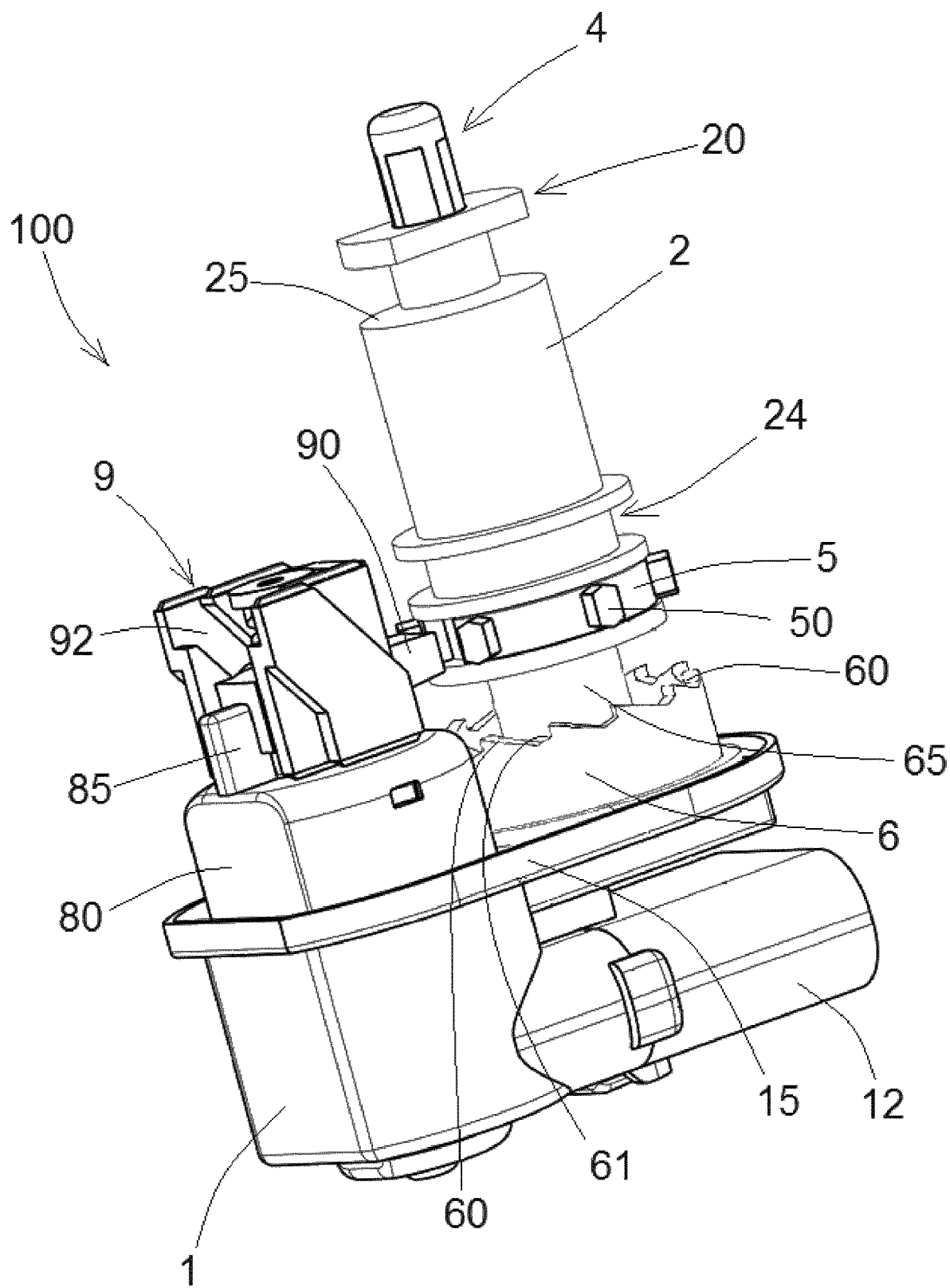
FIG. 2 is a perspective view of the lock of FIG. 1 in assembled condition, without the lid.

With reference to FIGS. 1 and 2, the lock (100) comprises a box (1) and a cover (10) that contain the parts of the lock. An electric connector (11) is connected to the box (1) by means of a gasket.

The cover (10) has an axial channel (13) (FIG. 2B) where a locking pin (2) is mounted. The locking pin (2) has a head (20) suitable for engaging a housing (201) (FIG. 5) of a lid (200). The head (20) of the locking pin has a T-shaped axial section. The head (20) of the locking pin protrudes from the cover (10) in upper position.

Figure 3:
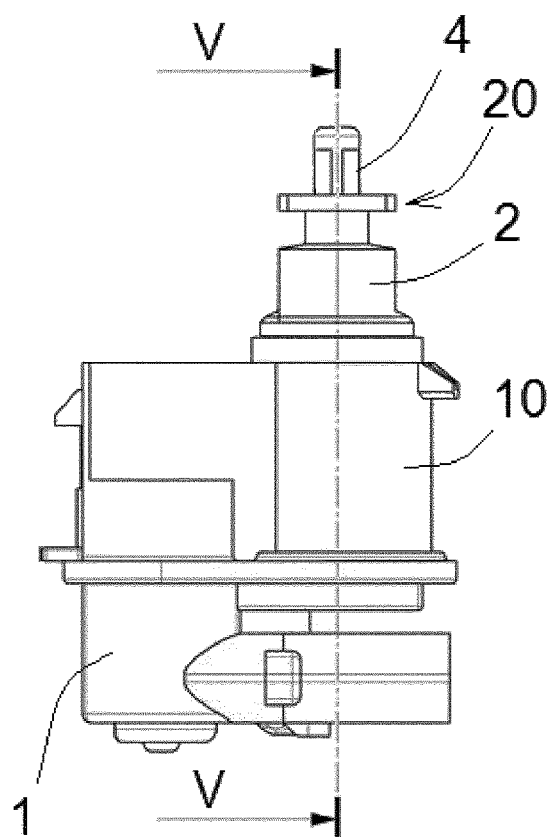
FIGS. 3 and 4 are side views of the lock of FIG. 1, respectively in open position and in closed position.
Figure 4:
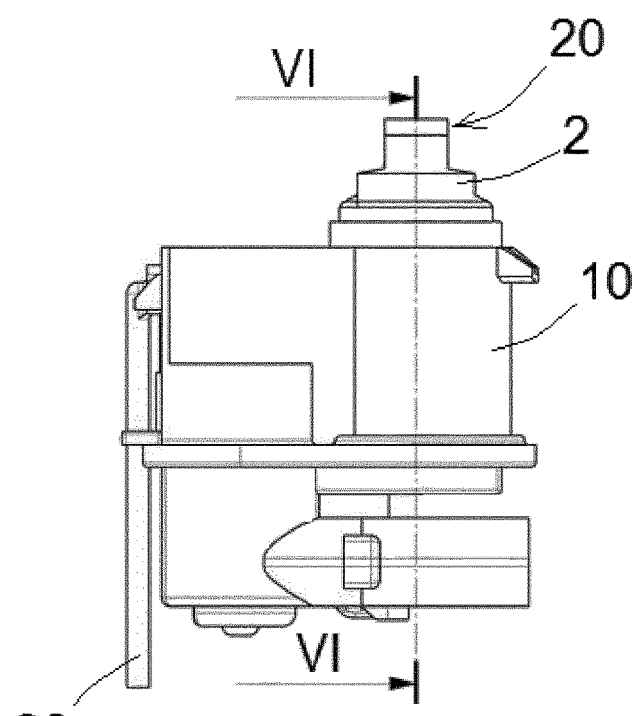

The locking pin (2) moves inside the cover with a rototranslation movement in order to go from an extracted opening position (FIGS. 3 and 5), wherein the lid (200) is open, to a retracted closing position (FIGS. 4 and 6), wherein the lid (200) is closed and the head (20) of the locking pin engages the housing (201) of the lid.

A helical coupling is provided between the locking pin (2) and the box (1) or the cover (10), in such a way to obtain a rototranslation movement of the locking pin (2). The locking pin (2) is internally empty and comprises an axial through channel (21) (FIGS. 5 and 6) that is open in upper and lower position. A shank (65) is integral with the box (1). The shank (65) is disposed in the axial channel (21) of the locking pin.

The shank (65) has a projection (66) that projects outwards and is engaged in a guiding groove (22) obtained in an internal surface of the locking pin (2). The guiding groove (22) has a helical shape. In view of the above, the locking pin (20) is forced to make a rototranslation movement.

A central pin (4) is mounted with possibility of axially sliding in the shank (65) and in the axial channel (21) of the locking pin, in order to go from a retracted position (FIGS. 3 and 5), wherein an upper portion (45) of the central pin protrudes from the head (20) of the locking pin, to a retracted position (FIGS. 4 and 6), wherein the central pin is retracted inside the locking pin.

The central pin (4) has an external collar (40) that protrudes radially outwards. The shank (65) has an internal collar (67) that protrudes radially inwards. The locking pin (2) comprises a shoulder (25).

A spring (M) is disposed inside the shank (65) around the central pin (4). The spring (M) has a first end (M1) that is stopped against the internal collar (67) of the shank, and a second end (M2) that is stopped against the external collar (40) of the central pin. In view of the above, the spring (M)

pushes the central pin (4) upwards, until the external collar (40) of the central pin is stopped against the shoulder (25) of the locking pin. In such a situation, the spring (M) keeps on pushing the central pin (4) and the locking pin (2) upwards.

When the collar (40) of the central pin is stopped against the shoulder (25) of the locking pin, the central pin is in extracted position.

Detection means (3) detect when the central pin (4) is in retracted position or in extracted position. The detection means (3) are connected to a control unit of the vehicle in order to provide information on the status of the central pin (4).

The central pin has a lower portion (46) opposite to the upper portion (45). Advantageously, the detection means (3) are mounted in the box (1) or in the shank (65) to detect when the lower portion (46) of the central pin (4) moves close to the detection means (3) or touches the detection means (3) in such a way to detect when the central pin (4) has reached its retracted position.

Advantageously, the detection means (3) comprise a Reed switch (30) mounted on a printed circuit board (31) provided with a hole for the insertion of a lower portion of the central pin (4). In such a case, a magnet (43) is disposed in the lower part (46) of the central pin (4). When the magnet (43) of the central pin is close to the Reed switch (30), the Reed switch (30) changes its status, informing that the central pin (4) is in retracted position. The Reed switch (30) is normally open and closes when the magnet (43) of the central pin is close to the Reed switch.

In place of the Reed switch, the detection means (2) can comprise a microswitch disposed in such a way to be activated by the lower end of the central pin (4).

The lock (100) is of push type, and can be open by pushing the lid (200) towards the lock, in such a way to push the locking pin (2) inwards.

In order to perform the "push" function, the lock (100) comprises:
  a lower cam (6) fixed to the box (1);
  an upper cam (7) integral with the cover (10); and
  and at least one follower (50) connected to the locking pin (2) and disposed between the lower cam (6) and the upper cam (7).

The lower cam (6) can be integral with the shank (65). The lower cam (6) has a cylindrical body disposed around the shank (65). The lower cam (6) has an upper edge with a triangular sawtoothed profile comprising a plurality of ramps (60) that end into corresponding seats (61).

Figure 2A:
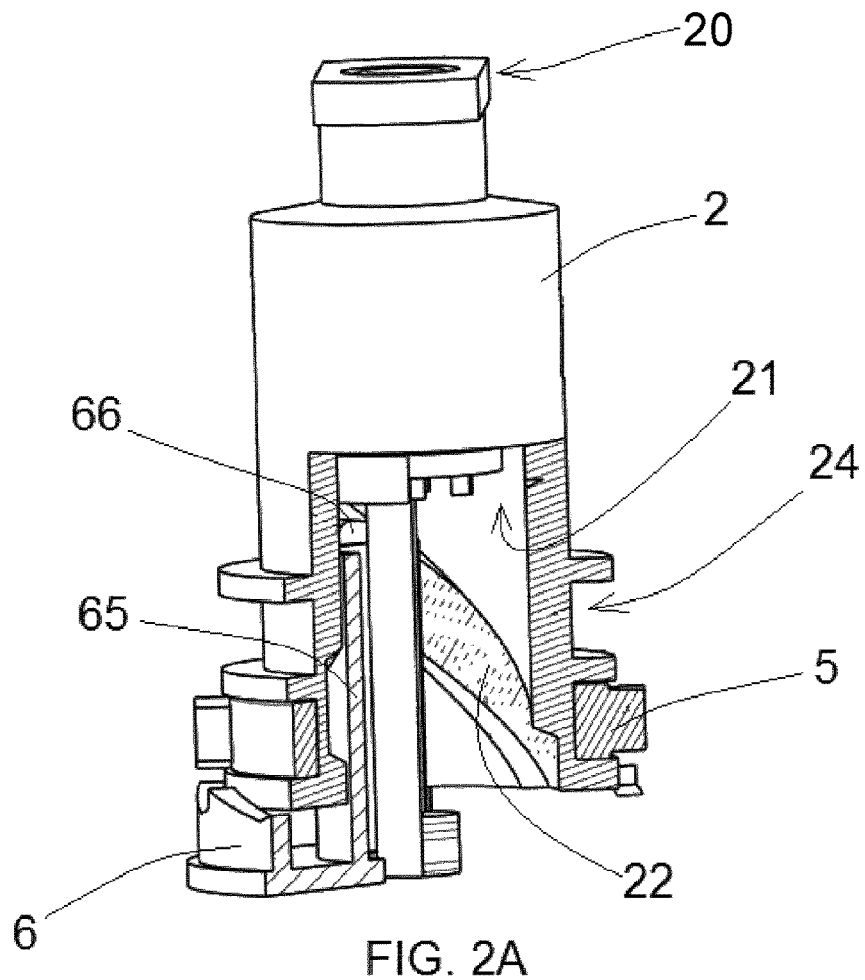
FIGS. 2a and 2B are sectional views of two details of the lock of FIG. 2.
Figure 2B:
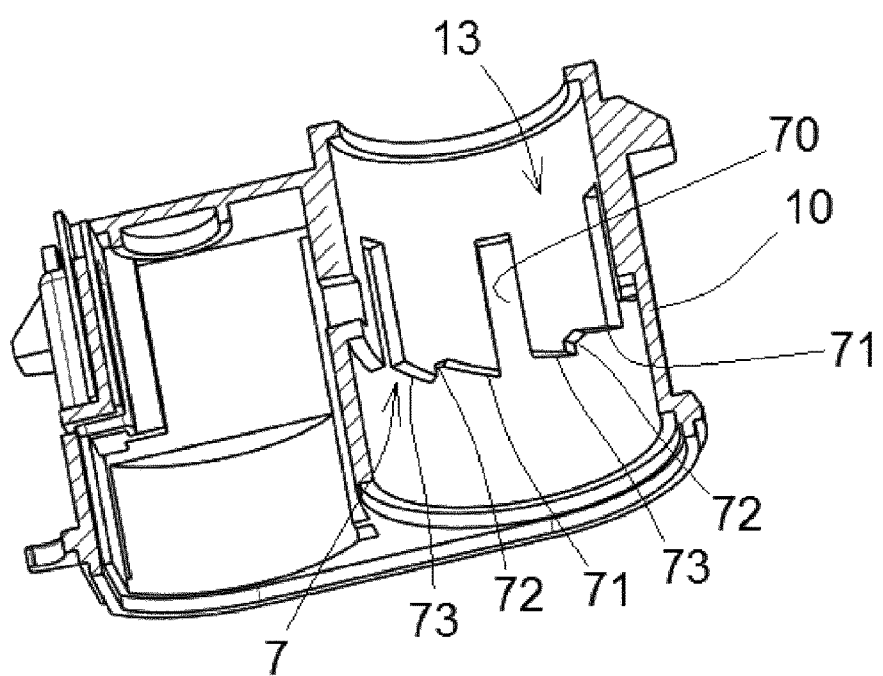

With reference to FIG. 2B, the upper cam (7) is disposed in the cover (10). The upper cam (7) has a cylindrical body provided with a lower edge with a square wave profile, which comprises first ramps (71) that end into corresponding seats (72), and second ramps (73) that end into longitudinal grooves (70).

Figure 14A:
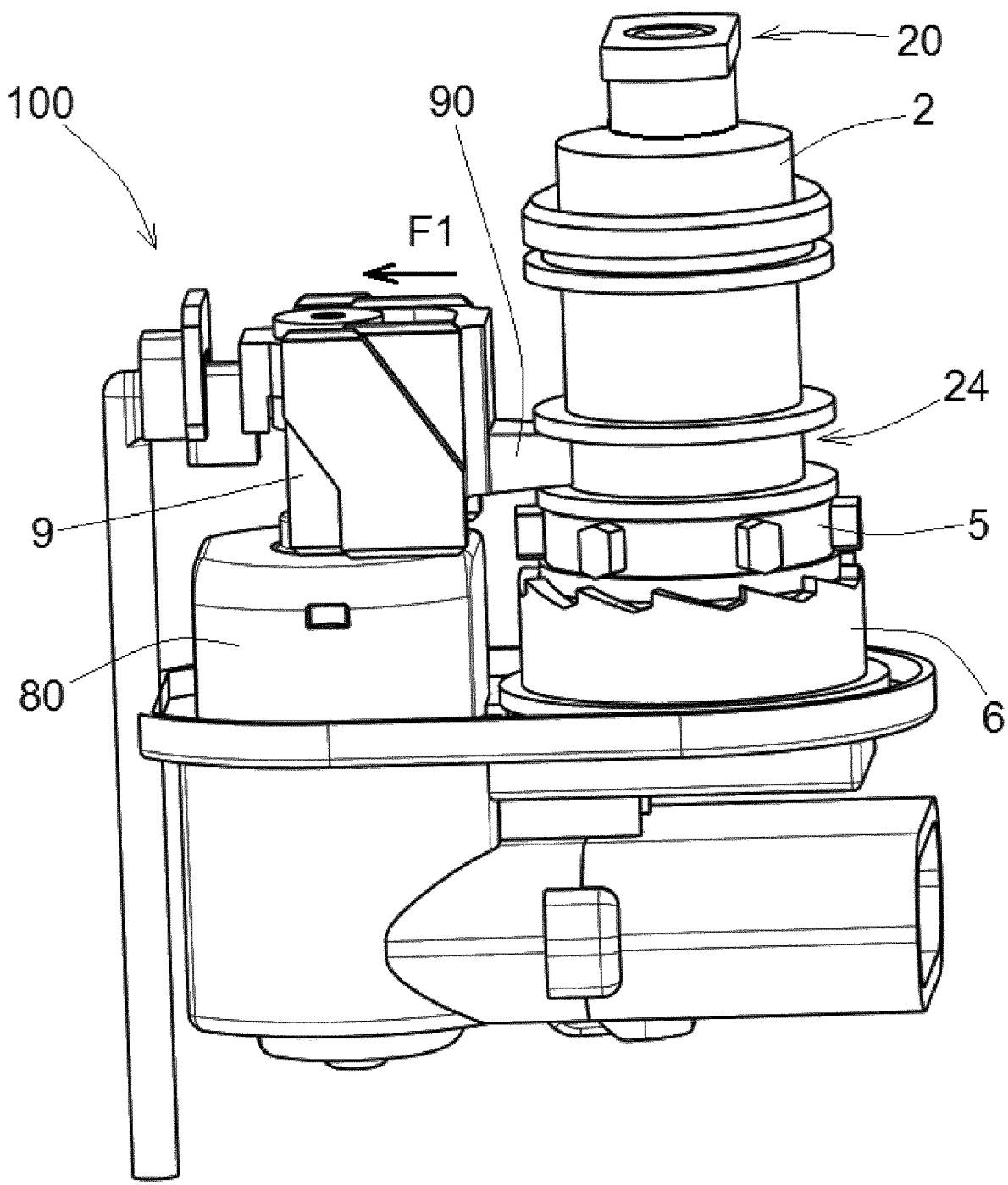
Figure 14B:
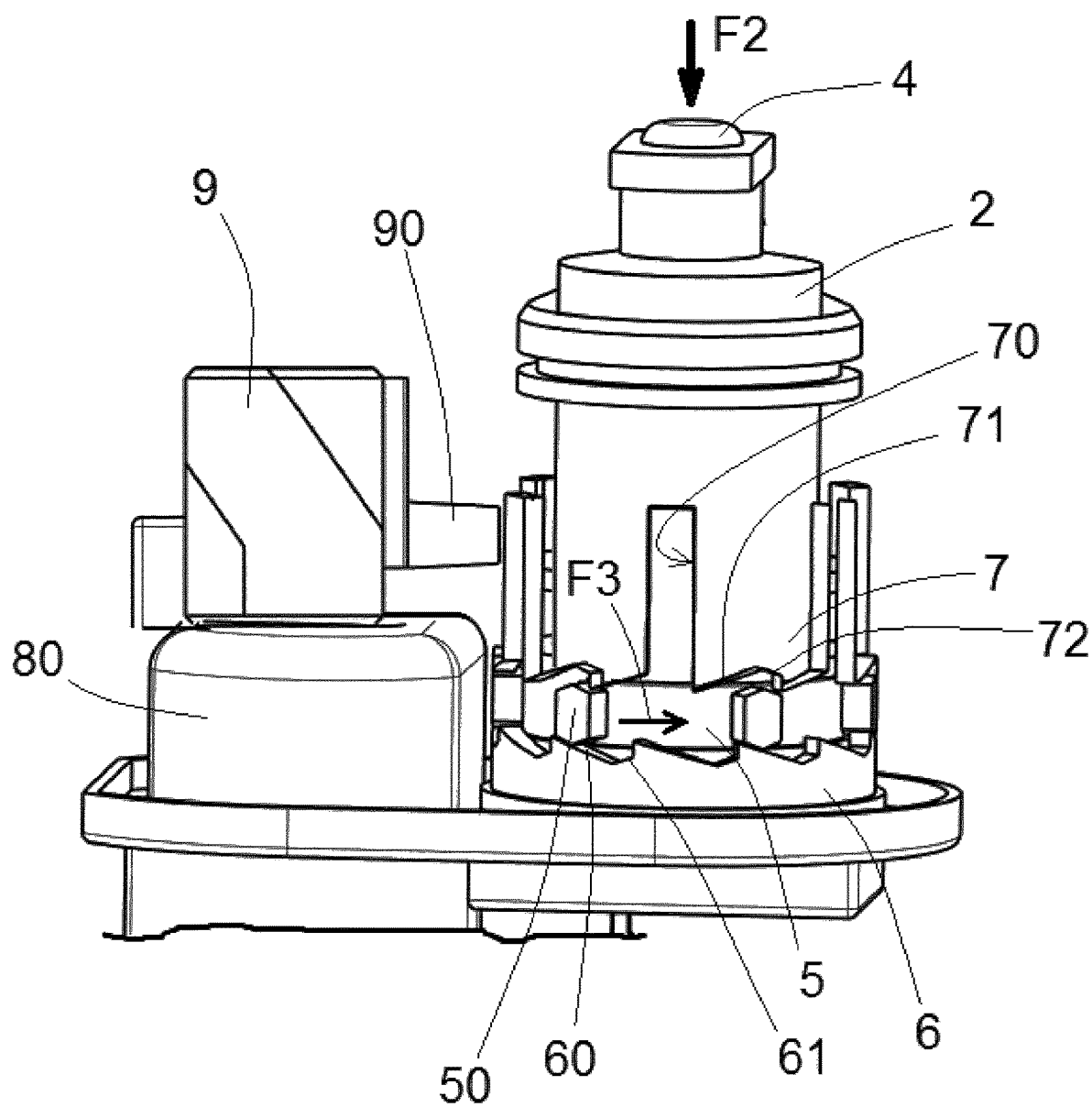

With reference to FIG. 14B the lower cam (6) and the upper cam (7) are disposed one in front of the other, in such a way that the seats (61) of the lower cam are disposed in correspondence of the first ramps (71) of the upper cam; the seats (72) of the upper cam are disposed in correspondence of the ramps (60) of the lower cam; and the longitudinal grooves (70) of the upper cam are disposed in correspondence of the ramps (60) of the lower cam.

The lock comprises a ring (5) that is revolvingly mounted in an annular seat (23) obtained in the locking pin (2). A plurality of followers (50) protrudes radially from the ring (5). At least one follower (50) can be provided. Advantageously, the number of followers (50) can be 3 or a multiple of 3 and in such a case they are disposed at the same angular distance. Each follower (50) has a hexagonal shape with an upward point and a downward point.

The lock (100) comprises a locking device (9) suitable for locking the locking pin (2) in retracted closing position. The locking device can go from a locking position, in which it blocks the locking pin, to an unlocking position, in which it unblocks the locking pin.

The blocking device (9) is controlled by an actuator (8) that is actuated by the control unit of the vehicle. For example, the actuator (8) is activated when the vehicle is stopped in order to bring the locking device to the locking position.

The locking device (9) comprises a projection (90) that projects radially from the locking device and is engaged in a locking seat (24) of the locking pin (2). The locking seat (24) can have an annular shape defined between two annular ribs and is obtained above the annular seat (23) that houses the ring with the followers (50).

The actuator (8) comprises an electric motor (80) with a drive shaft (81) whereon a screw (82) that engages with a female screw (83) is mounted. The female screw (83) has at least one follower (84) that slides in a cam (92) of the locking device (9). A translation of the female screw (83) causes a translation of the locking device (9) in such a way that the projection (90) of the locking device engages or disengages the locking seat (24) of the locking pin.

The female screw (83) has a fastener (85) fastened to an emergency cable (86) that can be pulled manually by a user in order to move the locking device (9) to its unlocking position.

FIGS. 7, 8 and 10 show the actuator (80) and the locking device (9) in locking position.

FIGS. 11, 12 and 13 show the actuator (80) and the locking device (9) in unlocking position.

With reference to FIG. 7A, when the lid is open, the locking pin (2) and the central pin (4) are in extracted position, therefore the detection means (3) do not detect the central pin (4), signaling the opening status.

If a user accidentally pushes the central pin (4) and the locking pin (2) to the retracted position, as shown in FIG. 7B, the detection means (3) detect the presence of the central pin (4) and send a signal to the control unit of the vehicle. While the central pin is pressed, the detection means (3) signal the presence of the central pin. Therefore, the control unit can be programmed in such a way to have a delay in reading the signal from the detection means (3) to avoid a possible signal caused by an involuntary actuation of the central pin (4).

It must noted that, moving independently relative to the locking pin (2), the central pin (4) will not remain in closed or retracted position without an external force (such as the lid (200)) that constantly pushes the central pin (4) in contact with the detection means (3). Therefore, if the actuator (8) is involuntarily closed, the locking pin (2) will remain blocked, whereas the central pin (4) will be free to return to the extracted position and therefore the control unit of the car will receive the open lid signal.

Then, when the user release the central pin (4) and the locking pin (2), as shown in FIG. 7C, the central pin (4) returns to the extracted position because of the thrust of the spring (M) on the central pin (4). So, the detection means (3) will not detect the central pin and will indicate the open lid condition to the control unit.

With reference to FIGS. 14A to 14E, the operation of the lock (100) is described.

As shown in FIG. 14A, the lock (100) is closed, so the projection (90) of the locking device in the locking seat (24)

of the locking pin (2), and the locking pin (2) cannot move in axial direction. When the vehicle is stopped (and is closed), the control unit of the vehicle controls the actuator (8) that moves the locking device (9) backwards in the direction of the arrow F1.

With reference to FIG. 14B, the locking device (9) is in unlocking position; therefore the projection (9) of the unlocking device does not engage the locking seat (24) and the locking pin is unblocked. However, the lock will not open because the follower (50) connected to the locking pin is stopped against the upper cam (7).

In order to open the lock, the user pushes the lid, which pushes the locking pin (2) downwards in the direction of the arrow F2. The follower (50) is stopped against the ramp (60) of the lower cam; therefore the ring (5) rotates in the direction of the arrow F3, whereas the follower (50) follows the ramp (60) up to the seat (61) of the lower cam.

Figure 14C:
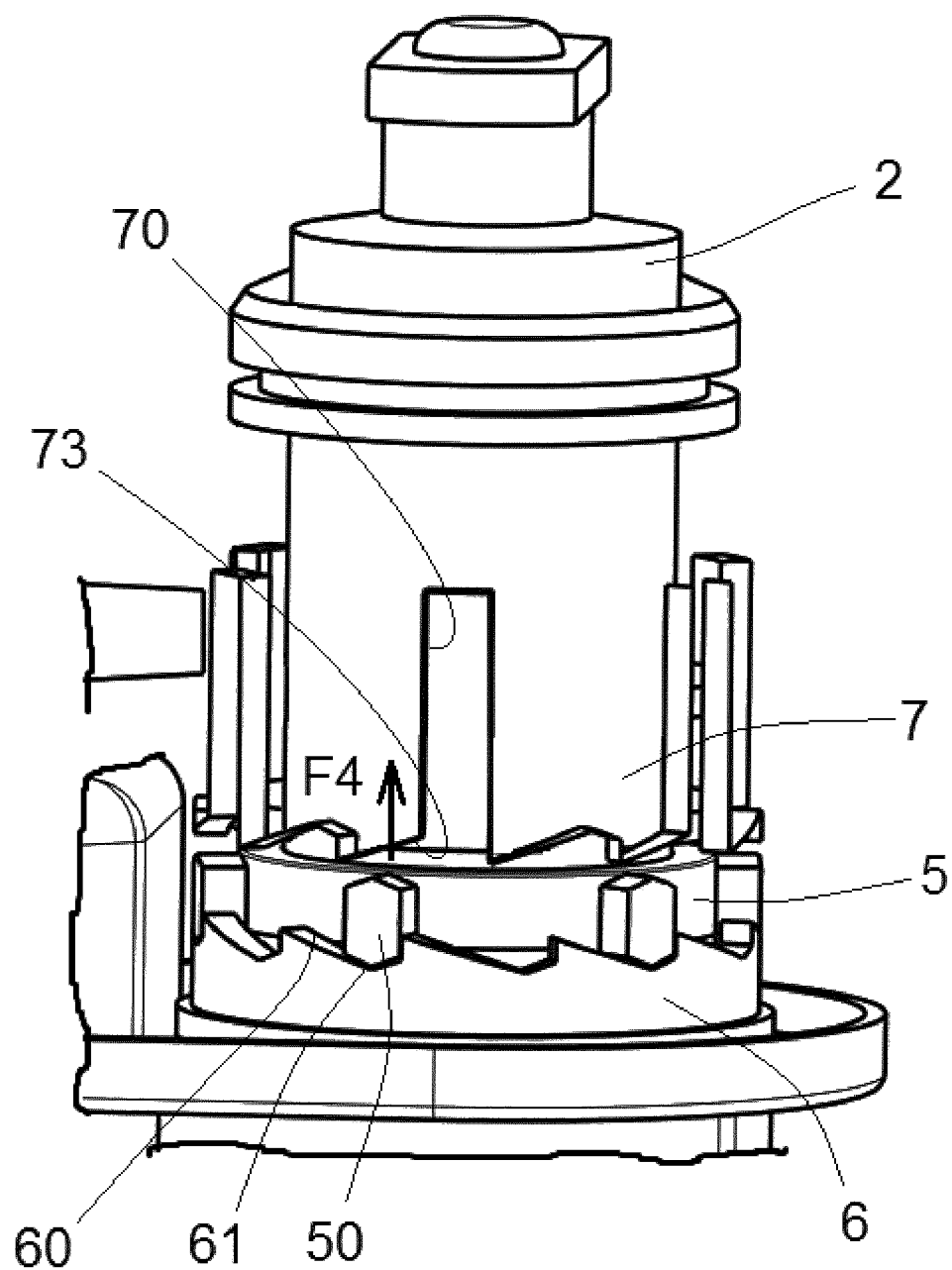

FIG. 14C shows when the follower (50) has reached the seat (61) of the lower ramp. Now, the spring is compressed (M) and therefore, when the user releases the lid, the locking pin (2) tends to rise because of the thrust of the spring (M) and the follower (50) is moved upwards in the direction of the arrow F4, being stopped against the second ramp (73) of the upper cam. The ring (5) rotates while the follower (50) follows the second ramp (73) of the upper cam towards the longitudinal groove (70).

Figure 14D:
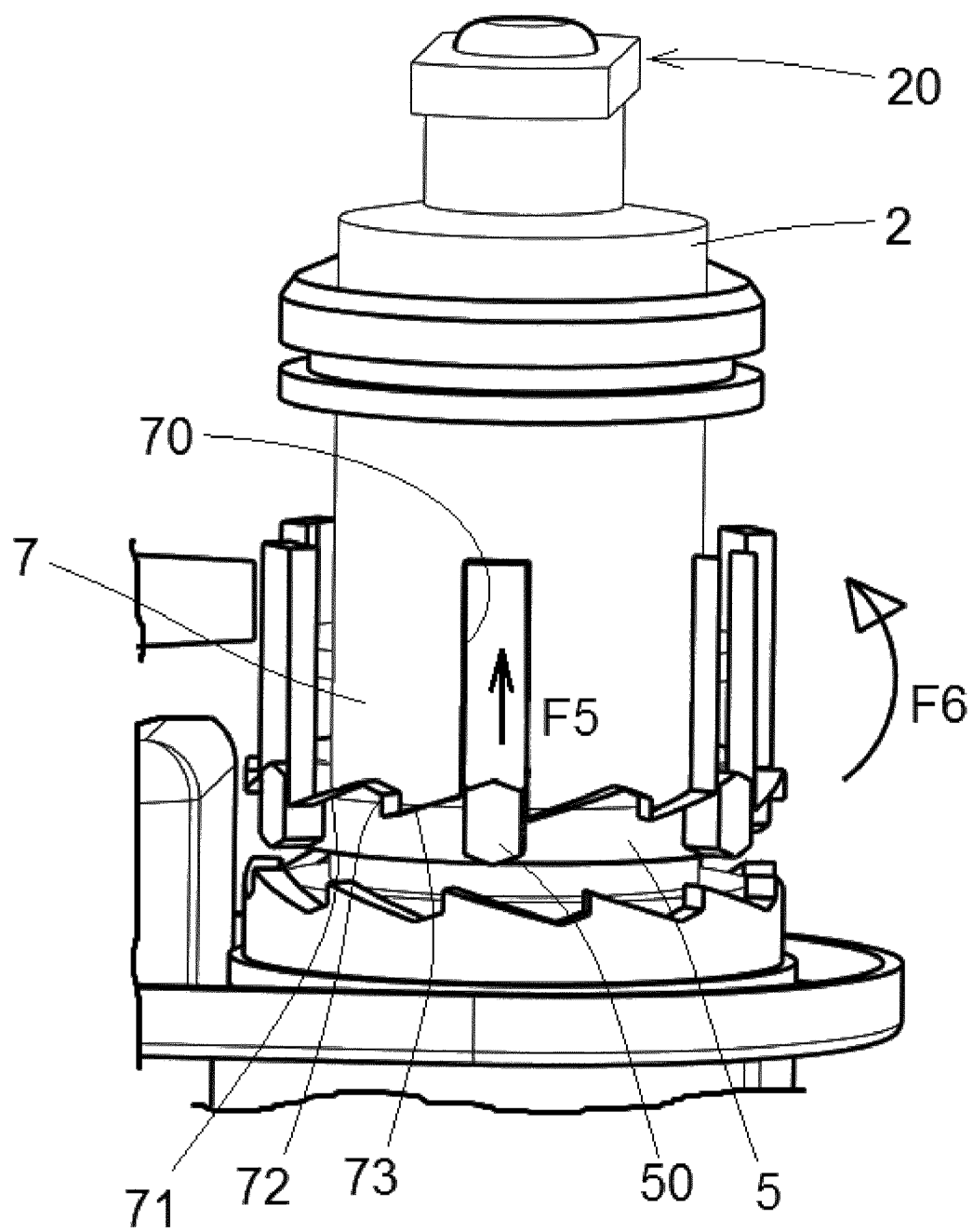
Figure 14E:
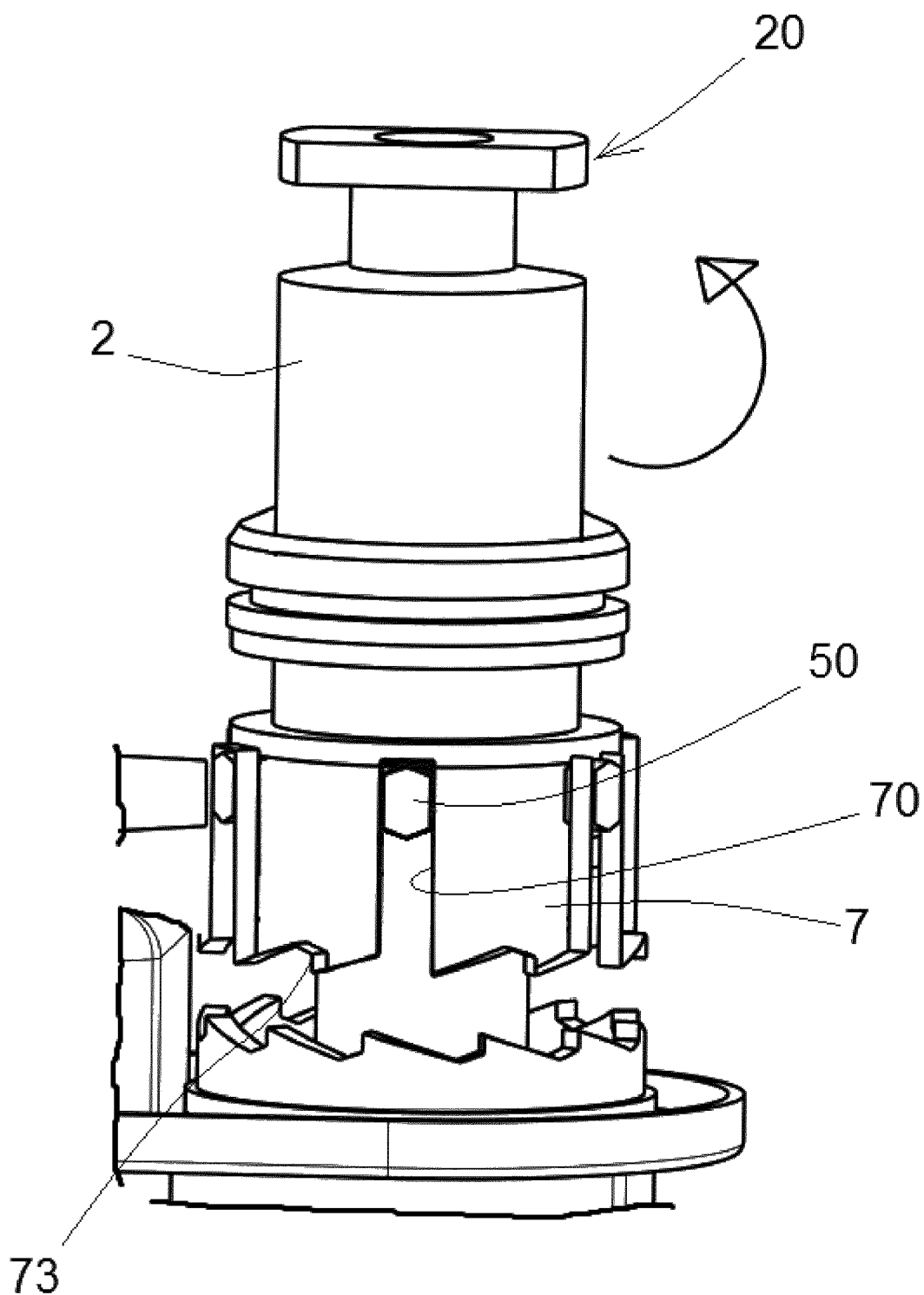

FIG. 14D shows when the follower (50) has reached the longitudinal groove (70) of the upper ramp. Now, the locking pin (2) tends to rise because of the thrust of the spring (M), therefore the follower (50) is moved upwards in the longitudinal groove (70) of the upper cam in direction of the arrow F5. During the upward movement of the locking pin (2), the helical guiding groove (66) (FIG. 2A) of the locking pin slides on the projection (66) of the shank, causing a rotation of the locking pin in the direction of the arrow F6.

Figure 5:
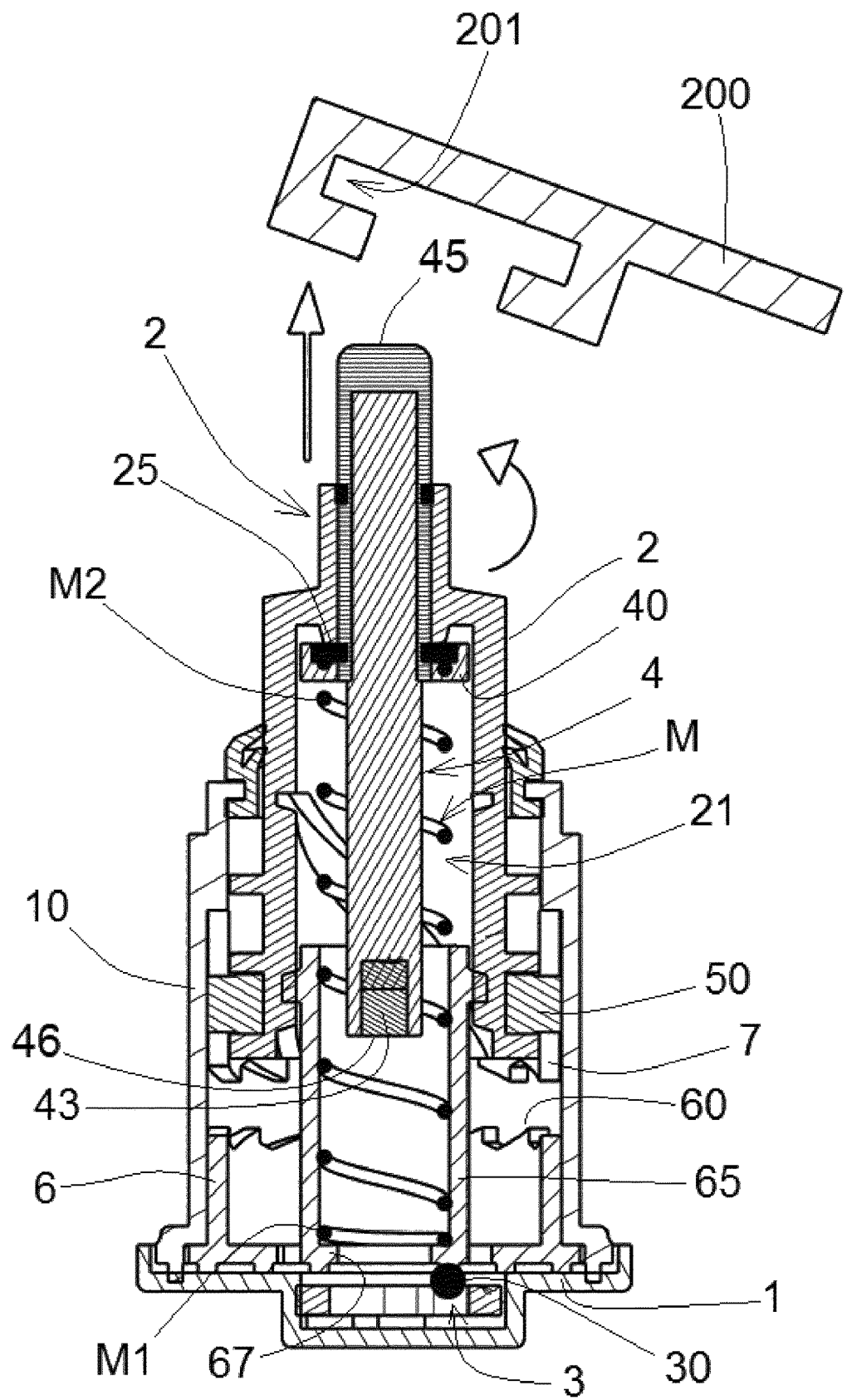
FIGS. 5 and 6 are two axial views respectively taken along the section planes V-V and VI-VI of FIGS. 3 and 4.
Figure 6:
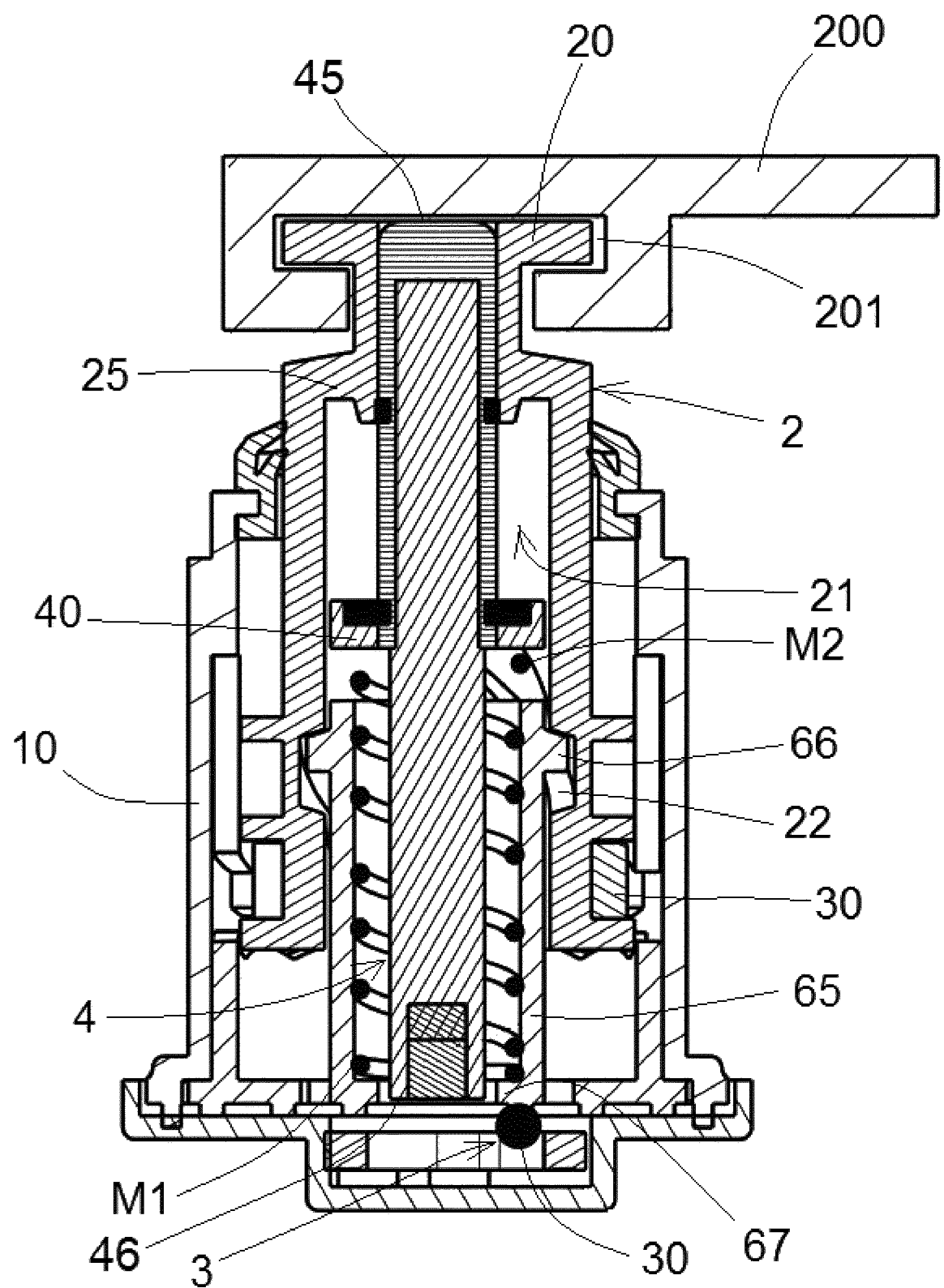

The pitch of the helical guiding groove (22) of the locking pin and the length of the longitudinal groove (70) of the upper cam are such to permit a rotation of the locking pin (2) of approximately 90°. Obviously, the device can also operate with a rotation of the locking pin that is lower than 90°. Consequently, the head (20) of the locking pin rotates by 90° and disengages the housing (201) of the lid (FIG. 5).

FIG. 14D shows when the follower (50) has reached the end of the longitudinal groove (70) of the upper cam and therefore the head (20) of the locking pin is rotated by 90° relative to the position of FIG. 14D, in such a way to disengage the housing (201) of the lid.

The invention claimed is:

1. Lock for a motor vehicle lid comprising:
   a box and a cover;
   a locking pin provided with a head that protrudes from the cover to engage with a housing of a lid to close the lid; said locking pin being mounted in such a way to make a rototranslation movement in said cover to go from a retracted closing position, wherein the head of the locking pin engages the seat of the cover, to an extracted opening position;
   wherein
   said locking pin is internally empty and comprises an axial through channel; and
   said lock also comprises:
      a central pin that is mounted with possibility of sliding axially in said axial through channel of the locking pin, in order to go from a retracted position inside said locking pin to an extracted position wherein an upper portion of the central pin protrudes in upper position from the head of the locking pin;
      a spring disposed between said box and said central pin to push the central pin and the locking pin to the extracted position; and
      detection means disposed in said box to detect when the central pin is in retracted position or in extracted position.

2. The lock of claim 1, wherein:
   said locking pin comprises a shoulder;
   said central pin comprises an external collar that protrudes radially outwards to stop against said shoulder of the locking pin; and said spring s disposed between said box and said external collar of the central pin.

3. The lock of claim 1, wherein said central pin has a lower portion opposite to said upper portion and said detection means are arranged in such a way to detect the lower portion of said central pin.

4. The lock of claim 1, wherein said detection means comprise a Reed switch and a magnet is disposed in said central pin in order to be detected by the Reed switch.

5. The lock of claim 1, further comprising a shank fixed to the box and disposed inside said axial through channel of the locking pin; said shank being provided with a projection disposed in a helical guiding groove obtained in an internal surface of said locking pin.

6. The lock of claim 5, wherein:
   said locking pin comprises a shoulder;
   said central pin comprises an external collar that protrudes radially outwards to stop against said shoulder of the locking pin;
   said spring is disposed between said box and said external collar of the central pin; and
   said shank has an internal collar and said spring has a first end on the internal collar of the shank and a second end stopped against said external collar of the central pin.

7. The lock of claim 1, further comprising:
   a lower cam fixed to the box;
   an upper cam integral with the cover; and at least one follower connected to the locking pin and disposed between the lower cam and the upper cam.

8. The lock of claim 7, comprising:
   a ring that is revolvingly mounted in an annular seat of said locking pin; and
   a plurality of followers that protrude radially from said ring.

9. The lock of claim 7, wherein:
   the lower cam has a cylindrical body provided with an upper edge with a triangular sawtoothed profile comprising a plurality of ramps that end in corresponding seats; and
   the upper cam has a cylindrical body provided with a lower edge with a square wave profile comprising first ramps that end in corresponding seats and second ramps that end in longitudinal grooves.

10. The lock of claim 1, further comprising:
    a locking device suitable for locking said locking pin, and
    an actuator that actuates said locking device; said actuator being electrically connected to a control unit of the vehicle.

* * * * *